(12) United States Patent
Lacy

(10) Patent No.: US 6,568,733 B1
(45) Date of Patent: May 27, 2003

(54) CARGO AREA EXTENSION DEVICE

(76) Inventor: Lawrence O. Lacy, 1020 Cliftwood Cir., Clifton Forge, VA (US) 24422

( * ) Notice: Subject to any disclaimer, the term of this patent is extended or adjusted under 35 U.S.C. 154(b) by 0 days.

(21) Appl. No.: 10/055,834

(22) Filed: Jan. 22, 2002

(51) Int. Cl.[7] .................................................. B62C 1/06
(52) U.S. Cl. ................................. 296/26.09; 296/57.1
(58) Field of Search .......................... 296/26.08, 26.09, 296/26.1, 26.11, 37.6, 57.1; 224/404, 498, 499

(56) References Cited

U.S. PATENT DOCUMENTS

| | | | | |
|---|---|---|---|---|
| 5,456,511 | A | * 10/1995 | Webber | 296/26.09 |
| 5,522,685 | A | * 6/1996 | Lessard | 296/26.09 |
| 5,700,047 | A | 12/1997 | Leitner et al. | |
| 5,752,800 | A | 5/1998 | Brincks et al. | |
| 5,816,638 | A | 10/1998 | Pool, III | |
| 5,924,753 | A | * 7/1999 | DiBassie | 296/26.09 |
| 6,113,173 | A | 9/2000 | Leitner et al. | |
| 6,276,738 | B1 | * 8/2001 | Marshall | 296/37.6 |
| 6,367,858 | B1 | * 4/2002 | Bradford | 296/26.09 |
| 6,422,627 | B1 | * 7/2002 | Kuhn et al. | 296/26.1 |
| 2002/0105201 | A1 | * 8/2002 | Melotik et al. | 296/26.09 |

OTHER PUBLICATIONS

Brochure entitled "Chevy/GMC Pickups," Flyer 37, including p. 13 (Applicant is not certain of the publication date for this reference, though it refers to "2001.").

* cited by examiner

Primary Examiner—Stephen T. Gordon
Assistant Examiner—Jason Morrow
(74) Attorney, Agent, or Firm—Hamilton & Terrile, LLP; Michael Rocco Cannatti

(57) ABSTRACT

A cargo area extender is provided that consists of a top panel, a bottom panel and two side panels. When the tailgate of a truck or SUV is opened, hinged pins in the side panels pull the side panels into channels on the bottom panel. Once the tailgate is lowered, the top panel, which is adjacent to the bottom panel and connected to the bottom panel with hinges, is rotated upward and outward around the hinges. A latch on the bottom panel is then deployed to extend and lock the side panels into an open position. The top panel is closed to form a temporary tailgate. A handle on the top panel latches the top panel to the cargo area extender sliding side panels and the cargo area extender is fully deployed.

24 Claims, 13 Drawing Sheets

CARGO AREA EXTENSION DEVICE

BACKGROUND

1. Technical Field

The invention relates generally to a device that increases the usable cargo area of a cargo container and, more specifically, to a device that, when deployed, provides additional cargo space in a vehicle such as a truck, sports utility vehicle, van, trailer or utility cart and, when not deployed, is stored in the vehicle with minimal lost cargo space.

2. Related Art

In recent years, sports utility vehicles (SUVs), vans and pickup trucks have become increasingly popular among United States consumers. These passenger and work vehicles often provide more room for passengers than a standard passenger vehicle; and, in addition, provide users with an area to store and carry a variety of cargo. SUVs, vans and pickup trucks thus combine the comfort of a passenger vehicle with the utility of a trailer or utility cart.

Many of these vehicles, as well as trailers and utility carts, have a fixed-sized area in which to fit cargo. For example, a standard-sized pickup truck is typically available with either a six-foot or an eight-foot cargo area, or "bed." If an optional tool chest is installed into the truck bed, the usable length of the truck bed may be reduced by as much as two feet. Although an eight-foot bed can carry a wider variety and greater quantity of goods than a six-foot bed, the additional two feet makes the pickup truck longer and less maneuverable. A longer vehicle is also typically more difficult to park. A pickup truck with a six-foot bed may be more practical in some situations, but the length of the bed can be a problem if the driver desires to carry something longer than six feet, such as an eight-foot piece of lumber. A pickup truck, trailer or cart with an eight-foot bed will, in spite of the extra two feet, present similar problems when the intended cargo is longer than eight feet or the usable length of the bed has been shortened by the installation of a tool chest.

Several methods have been developed to address this "eight-foot board/six-foot bed" problem. One simple solution is to open a tailgate, if the vehicle has one, and let the cargo either rest upon the lowered tailgate or, if necessary, extend beyond the tailgate. There are drawbacks to this solution. For example, in a SUV or van, an open rear door or tailgate prevents an air conditioning unit from functioning properly and may even allow exhaust fumes to enter the vehicle. In a SUV, van or pickup truck, a lowered tailgate can also obscure the view of the rear tail and brake lights for vehicles that follow. Visibility problems and the possibility that loose cargo may simply slide out an open tailgate present safety issues that may give rise to liability and legal problems in the event of an accident.

Recently, a truck bed extender has appeared on the market that consists of a U-shaped, metal and fiberglass gate of an open fence design. This gate fastens to the rear of a truck's cargo area at the ends of the 'U' and extends into the bed when not in use. When a user desires to extend the cargo area, the user lowers the tailgate, pivots the gate over and outward around the ends of the 'U', and rests the gate upon the lowered tailgate. Although this approach may address the long cargo issue, it does not necessarily address all the safety issues and, in fact, may create other problems, e.g., the possibility that narrow objects can slide through openings in the gate and, when the gate is not in use, the gate occupies space in the cargo area that can be used for other purposes. The U-shaped gate may be removable, thus eliminating some problems, but a gate that must be removed and reinstalled between uses is not as convenient as a permanently installed gate.

SUMMARY OF THE INVENTION

A cargo area extender is provided that increase the cargo area of a sports utility vehicle (SUV), pickup truck, van, trailer or utility cart. For example, the cargo area extender can convert a six-foot pickup truck bed into an eight-foot bed. In a SUV or van, the cargo area can be converted into a temporary pickup bed-like storage area without having to fold or remove seats.

The cargo area extender consists of four panels: a top panel, a bottom panel and two side panels. Each side panel includes an inner side panel and an outer side panel. The bottom panel may be built as part of a tailgate. In a truck or an SUV, when the tailgate is opened, hinged pins in the inner side panels pull the inner side panels into channels on the bottom panel. The channels are flanged to ensure proper alignment with the inner side panels. The side panels can also be telescoping to make the cargo area extender more compact, thus conserving space.

In a van, the flanges are unnecessary because the channels can extend into fixed side panels, which can be built into or installed in the van and provide a framework in which the moveable side panels can both slide and be stored. In this configuration, the cargo area extender is mounted so that the entire unit rolls out in a fashion similar to a cabinet drawer.

Once the tailgate is lowered, or, in a van, the cargo area extender has been slid out from the fixed side panels, the top panel, which is adjacent to the bottom panel and connected to the bottom panel with hinges, is rotated upward and outward around the hinges. A mechanism on the bottom panel is then deployed to extend and lock the side panels into an open position. A handle on the top panel latches the top panel, which now functions as a temporary tailgate, to the cargo area extender sliding side panels and the cargo area extender is thus fully deployed. In vans and SUVs, the top panel tailgate can also be designed so that it can latch to the vehicle's rear door.

The advantages of the cargo area extender are numerous and include the following attributes:

(1) Adaptable: The same design can be used for trucks, SUVs, vans, utility vehicles, and, with slight modifications, minivans.

(2) Compatible: Panels of the device can be designed to conform to individual vehicle model styling and shape. For example, the side panels of the device in SUVs and minivans can match the shape of the door and include a seal so that the cargo area extended area is weather proof.

(3) Versatile: The cargo area extender can be either installed by the vehicle manufacturer at the factory or sold as an after-market accessory.

(4) Compact: The top, bottom and side panels are narrow and occupy little or none of a vehicle's original cargo space.

(5) Modular: Most parts of the cargo area extender are common regardless of the size of a vehicle. Connecting rods have multiple pivot point holes and sleeves to fit a variety of applications. Standard channels can be manufactured separately and fitted into top and bottom panels of different sizes.

(6) Easy to Use: Device operation is straightforward; there are no parts to fold or hold in place while opening or closing the device.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION OF THE FIGURES

Figure 1A:
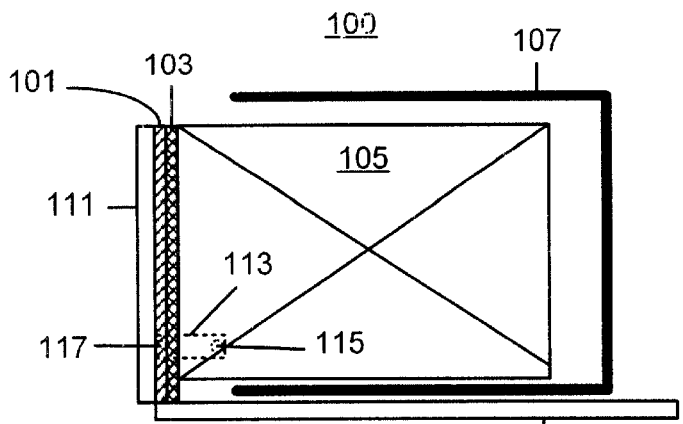
FIGS. 1A–1F are diagrams showing various positions of the cargo area extension device, including the relative positions of a bottom panel, a top panel, an inner side panel and an outer side panel with respect to a pickup truck bed and tailgate.

Although described with particular reference to specific vehicles and trailers, the following device is applicable to a number of other vehicles and trailers such as large trucks, vans and small utility trailers. The device of the claimed subject matter may be used advantageously in many cargo hauling and cargo storage devices to maximize an available cargo area and/or minimize storage area needed for the cargo device when the device is not in use.

Turning now to the figures, FIGS. 1A–F are diagrams showing various positions of the cargo area extension device 100, including the relative positions of a bottom panel 101, a top panel 103, an inner side panel 105 and an outer side panel 107 with respect to a pickup truck (not shown) cargo area, or "bed," 109 and a tailgate 111 of the pickup truck. Although this example focuses on an embodiment of the invention installed in the bed 109 of a pickup truck, the claimed subject matter is equally applicable to a sports utility vehicle (SUV), a van, a minivan, a cargo trailer or many other devices that either carry or store cargo.

Figure 1B:
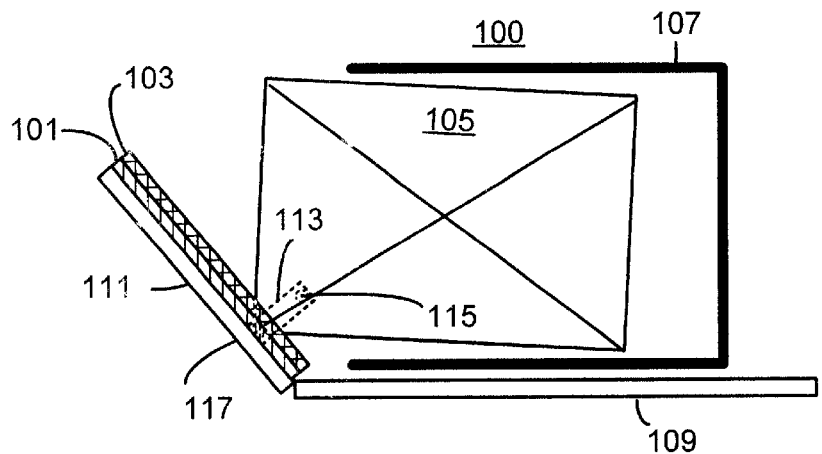
Figure 1C:
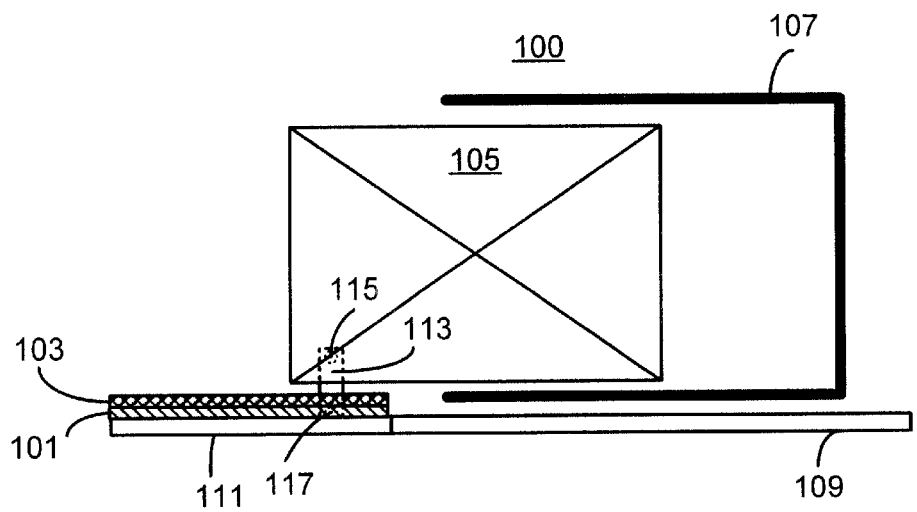

In FIG. 1A, the cargo area extender 100 is illustrated in a Tailgate Closed position. In the Tailgate Closed position, the bottom panel 101 fits against the tailgate 111 and the upper panel 103 fits against the bottom panel 101. In the Tailgate Closed position, the tailgate 111, the bottom panel 101 and the top panel 103 are positioned at a ninety degree (90°) angle with respect to the truck bed 109. It should be noted that, although the bottom panel 101 is illustrated here as a distinct piece from the tailgate 111, the bottom panel 101 and the tailgate 111 can be constructed as a single piece such as when the cargo area extender 100 is manufactured as part of the pickup truck's original equipment or as a factory option. In this example, the cargo area extender 100 is an aftermarket device installed on the pickup truck. Thus, the bottom panel 101 is affixed to the inside of the tailgate 111. The bottom panel 101 can be affixed to the tailgate 111 in any one of a number of ways, which should be apparent to those with skill in the mechanical arts. The upper panel 103 is attached to the bottom panel 101 by means of the one or more hinges 219 (see FIGS. 2A–B) and, in the closed position, fits snuggly against the bottom panel 101 on the side opposite the tailgate 111, or on the inside of the truck bed 109. Whenever the bottom panel 101 and the top panel 103 are adjacent each other, as illustrated in FIGS. 1A–1C, a latch plunger 505 (see FIGS. 5A–B) operated by a latch mechanism 201 fits into a notch 213 (see FIGS. 2A–B), keeping the bottom panel 101 securely in place relative to the top panel 103. The hinges 219 may be multiple hinges spaced at intervals between the top panel 103 and the bottom panel 101 or, in the alternative, be a single long hinge that extends from one side to the other side of the panels 101 and 103. The description in the following examples is based upon an exemplary embodiment with a single hinge 219.

In the Tailgate Closed position, the inner side panel 105 fits inside the outer side panel 107 and is coupled to the bottom panel 101 by means of a connecting rod 113. The inner side panel 105 and the outer side panel 107 are explained in more detail below in conjunction with FIGS. 3A–3D. The connecting rod 113 is attached to a sleeve 701 (see FIGS. 7A–B) at a fixture point 117 and attached to the inner side panel 105 at a fixture point 115. The connecting rod 113 is attached to the sleeve 701 at the fixture point 117 by means of retainers 631 (see FIGS. 6B–C) and slides in a channel 626 (see FIGS. 6A–C) in the bottom panel 101. The connecting rod 113 is attached at the fixture point 115 in a manner that allows the connecting rod 113 to rotate with respect to the inner side panel 105.

In FIG. 1B, the cargo area extender 100 is illustrated in a position corresponding to a Tailgate Half (½) Open position. In this view, the tailgate 111 is rotated forty-five degrees (45°) outward from its closed position. In a typical pickup truck, the tailgate 111 can rotate with respect to the truck bed between the ninety degree (90°) position shown in FIG. 1A and an one hundred eighty (180°) position, at which point a flexible strap (not shown) prevents the tailgate 111 from rotating farther. As shown in FIG. 1B, because the connecting rod 113 is attached to both the inner side panel 105 and the bottom panel 101 via the sleeve 701, the motion of the tailgate 111 from the Tailgate Closed position of FIG. 1A to the Half Open position pulls the inner side panel 105 outward with respect to the pickup bed 109 and the outer side panel 107, which is fixed either within side walls of the pickup bed 109 (when installed as part of the original manufacturing process) or fixed to the inner side wall of the pickup bed 109 (when installed as an after-market option). In addition, the motion of the tailgate 111 causes the connecting rod 113 to pull the inner side panel 105 into a channel, or track, in the bottom panel 101, ensuring that the inner side panel 105 is properly aligned with the bottom panel 101. As mentioned above in conjunction with FIG. 1A, the connecting rod 113 rotates with respect to the inner side panel 105.

In FIG. 1C, the cargo area extender 100 is illustrated in a Tailgate Open position corresponding to the tailgate 109 in a fully open position. In the Tailgate Open position, the tailgate 109 forms a one hundred eighty degree (180°) angle with the pickup bed 109 and the top panel 103 remains adjacent to the bottom panel 101 as in FIGS. 1A–B.

Figure 1D:
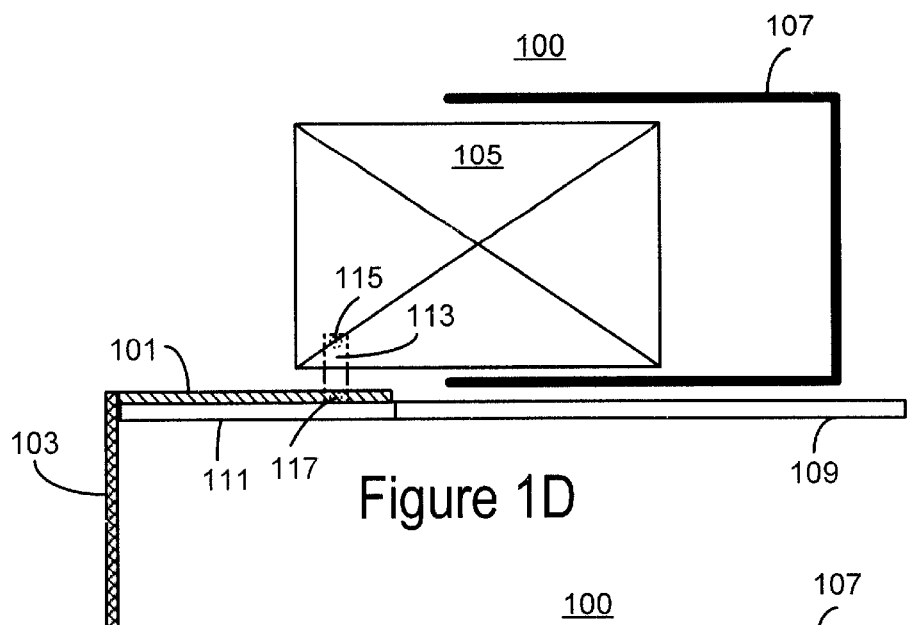

In FIG. 1D, the cargo area extender 100 is illustrated in a Top Panel Open position. In this position, the tailgate 111 is rotated ninety degrees (90°) from its closed position, as in FIG. 1C, or one hundred eighty degrees (180°) from the pickup bed 109. The latch mechanism 201 (see FIGS. 2A–B) is operated and the latch plunger 505 (see FIGS. 5A–B) is retracted to release the top panel 103 from its locked position with respect to the bottom panel 101. The top panel 103 is rotated around the hinge 219 two hundred seventy degrees (270°) with respect to the bottom panel 101 and tailgate 111.

Figure 1E:
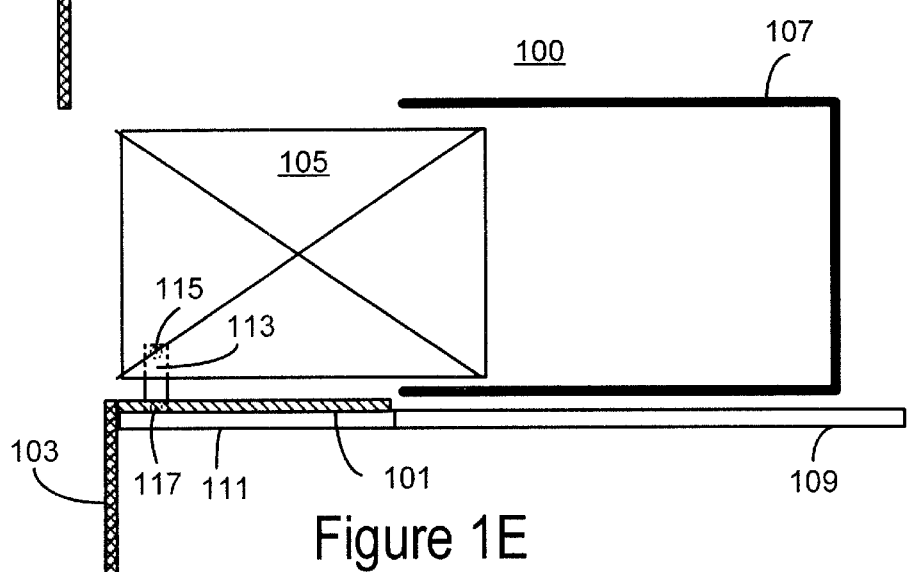

In FIG. 1E, the cargo area extender 100 is illustrated in a Side Panel Extended position in which, in addition to the tail gate 111 and the top panel 103 rotated as shown in FIG. 1D, the inner side panel 105 is moved rearward with respect to the outer side panel 107 and the side wall of the pickup bed 109 by means of an opening mechanism 401 (see FIGS. 4A–E, 6A–C and 7A–B). The inner side panel 105 is guided along the channel 626 by the connecting rod 113 connected to the lower panel 101 via the sleeve 701. The opening and latching mechanism 401 that moves and locks the inner side panel 105 into the Side Panel Extended position is described below in conjunction with FIGS. 4A–E, 6A–C and 7A–B.

Figure 1F:
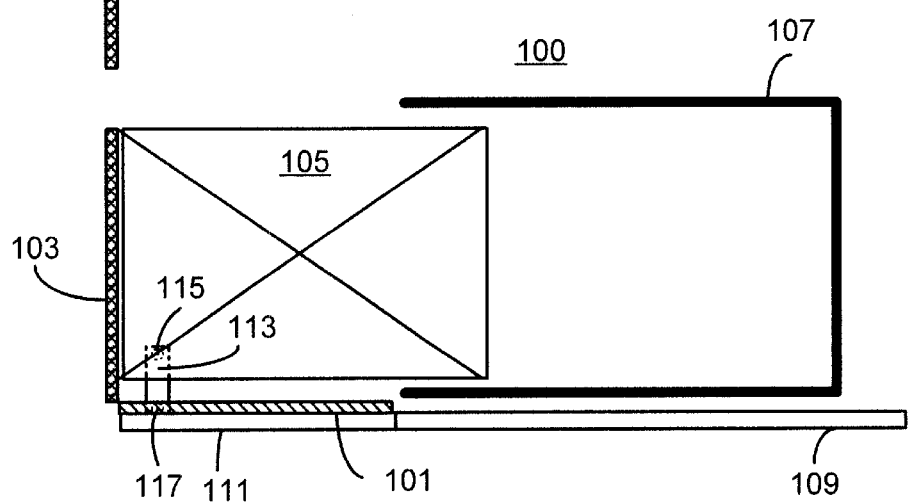
Figure 1G:
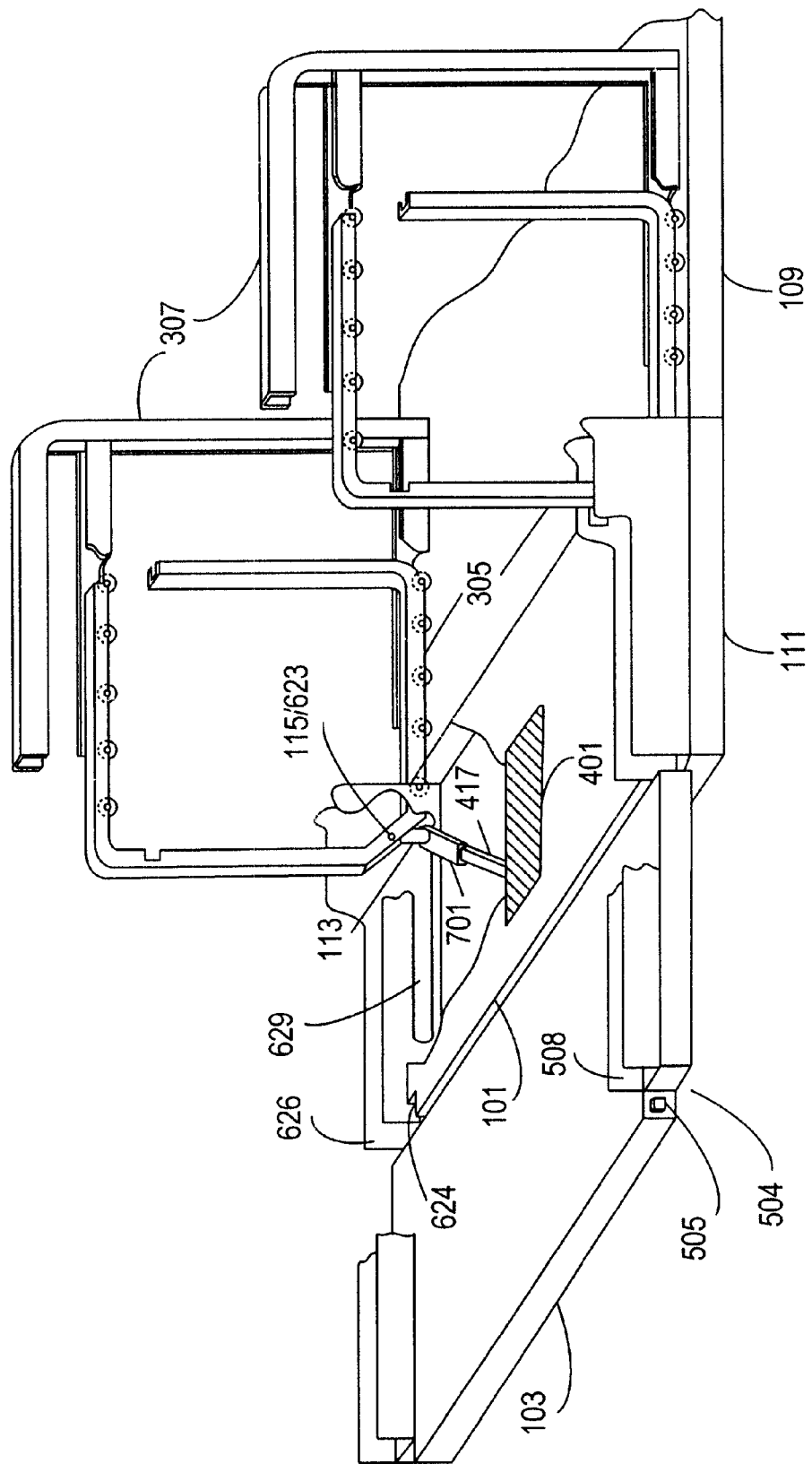

In FIG. 1F, the cargo area extender 100 is illustrated in a Top Panel Closed position. In the Top Panel Closed position, the tailgate 111 and the bottom panel 101 are both rotated one hundred eighty degrees (180°) with respect to the pickup bed 109 and the top panel is rotated back so that is rotated ninety degrees (90°) with respect to the bottom panel 101 and the tailgate 111. Thus, the top panel 103 serves as a tailgate that is positioned rearward of the original tailgate 111 closed position shown in FIG. 1A by approximately the length of the tailgate 111. At this point the inner side panel 105 and the top panel 103 are fastened together by means of the latch mechanism 201, the connecting rod 501 (see FIGS. 5A–B) and the latch plunger 505, each of which are described in more detail below in conjunction with FIG. 2A, 2B, 5A and 5B. The latch plunger 505 is the same latch plunger used to secure the top panel 103 to the bottom panel 101 as shown in FIGS. 1A–C.

For the sake of simplicity, the FIGS. 1A–F illustrate the cargo area extender 100 from one side of the pickup truck only. It should be noted that, on the other side of the truck bed 109, there is a second inner side panel and a second outer side panel. Like the inner side panel 105, the second side panel is also moved rearward by the movement of the tailgate 111 and the opening and latching mechanism 401 and also fastened to the top panel 103 in the Top Panel Closed position of FIG. 1F.

Figure 2A:
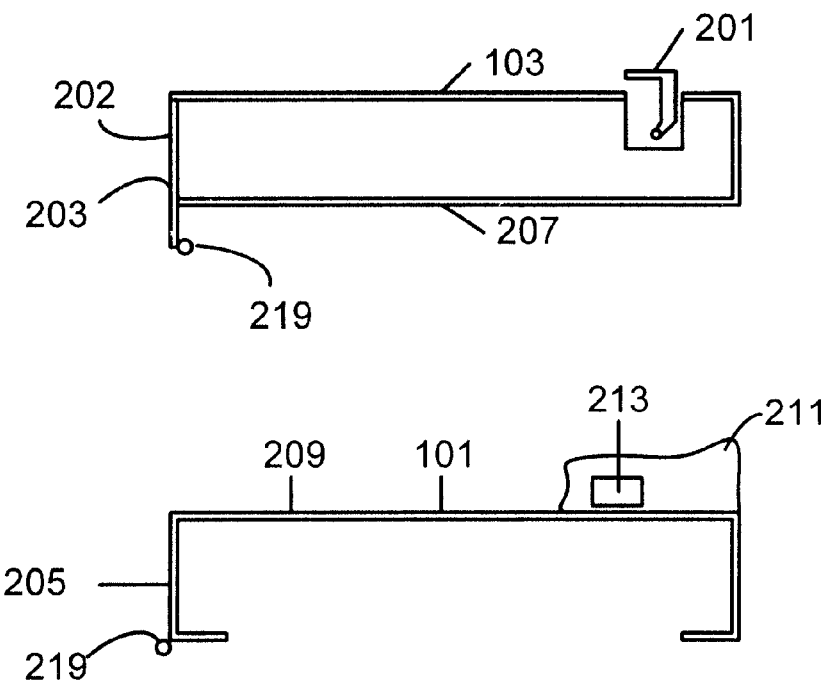
FIGS. 2A and 2B are diagrams of the top and bottom panel in more detail and alternative positions for hinges connecting the top panel and the bottom panel.
Figure 2B:
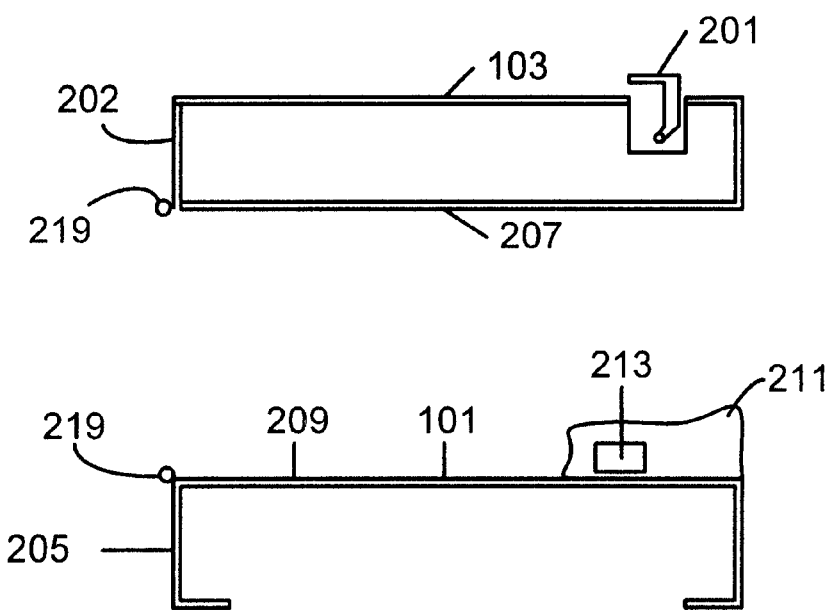

FIGS. 2A and 2B illustrate the bottom panel 101, the top panel 103 and alternative possible positions of hinges, such as a hinge 219, which connect the top panel 103 and the bottom panel 101. The latch mechanism 201 is attached to the top panel 103 and the notch 213, positioned in a tab 211, is in the bottom panel 101. There is also a tab 628 (see FIG. 6B) which is similar to tab 211 but without a notch such as notch 213. The tabs 211 and 628 fit between the top panel 103 and the pickup truck bed 109 when the bottom panel 101 and the top panel 103 are in the Tailgate Closed position of FIG. 1A. The top panel 103 has a notch 504 (see FIG. 5A) to accommodate tabs 211 and 628. Tabs 211 and 628 are positioned along the rear edge of side panel 105 in the Tailgate Closed position of FIG. 1A and along the bottom edge of the side panel 105 in the Tailgate Open position of FIG. 1C. The tabs 211 and 628 assure that the side panel 105 aligns with the channel 626 in the bottom panel 101.

In FIG. 2A, the hinge 219 is positioned at the bottom of a flange 203, which is an extension of an edge 202 of the top panel 103. The hinge 219 is also positioned at the bottom of an edge 205 on the bottom panel 101. The bottom panel 101 fits against the top panel 103, i.e., the left side of the edge 205 fits against the right side of the flange 203 and the top side 209 of the bottom panel 101 fits against the bottom side 207 of the top panel 103. When fitted together, the relative positions of the top panel 103 and the bottom panel 101 with respect to each other correspond to their relative positions shown in FIGS. 1A–C. With the hinge 219 in the position shown in FIG. 2A, the top panel 103 can rotate two hundred seventy degrees (270°) with respect to the bottom panel 101, as illustrated above in FIGS. 1D and 1E.

FIG. 2B illustrates an alternative placement position for the hinge 219. In this figure, the hinge 219 is positioned at the bottom of edge 202 of the top panel 103. With respect to the bottom panel 101, the hinge 219 is positioned at the top edge of the edge 205. As in FIGS. 1A–1C and 2A, the bottom panel 101 and the top panel 103 fit against each other. However, in this particular positioning of the hinge 219, the top panel 103 is only able to rotate one hundred eighty degrees (180°) with respect to the bottom panel 101.

Figure 3A:
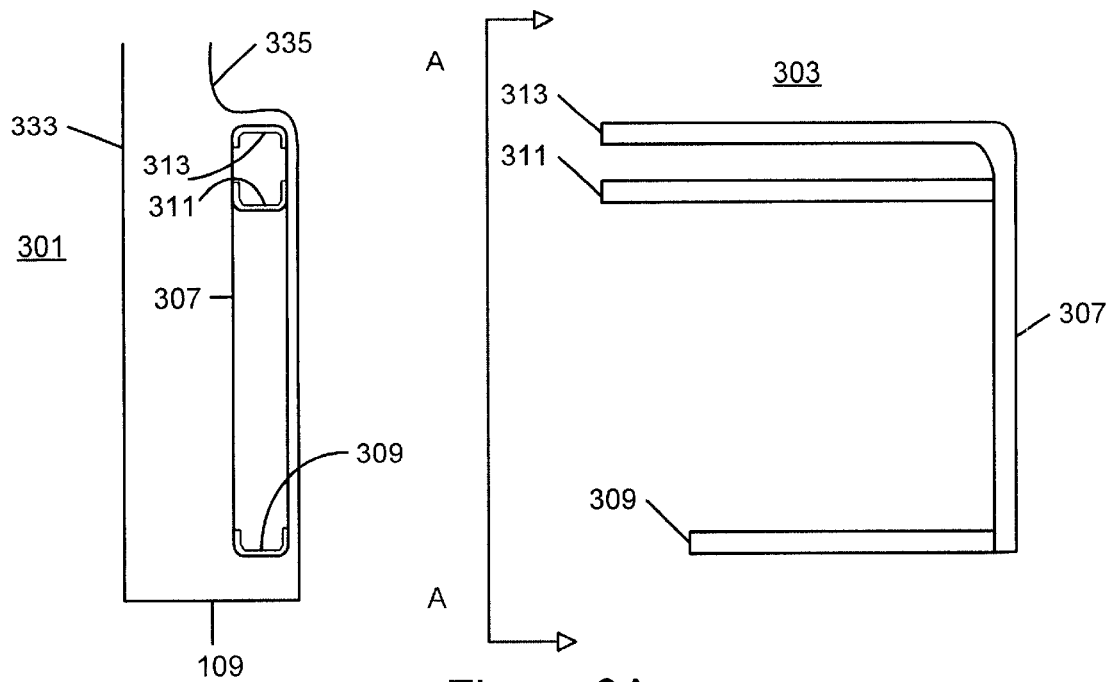
FIGS. 3A–3C are diagrams of various views of an inner side panel frame and an outer side panel frame, which supports the inner side panel frame.
Figure 3B:
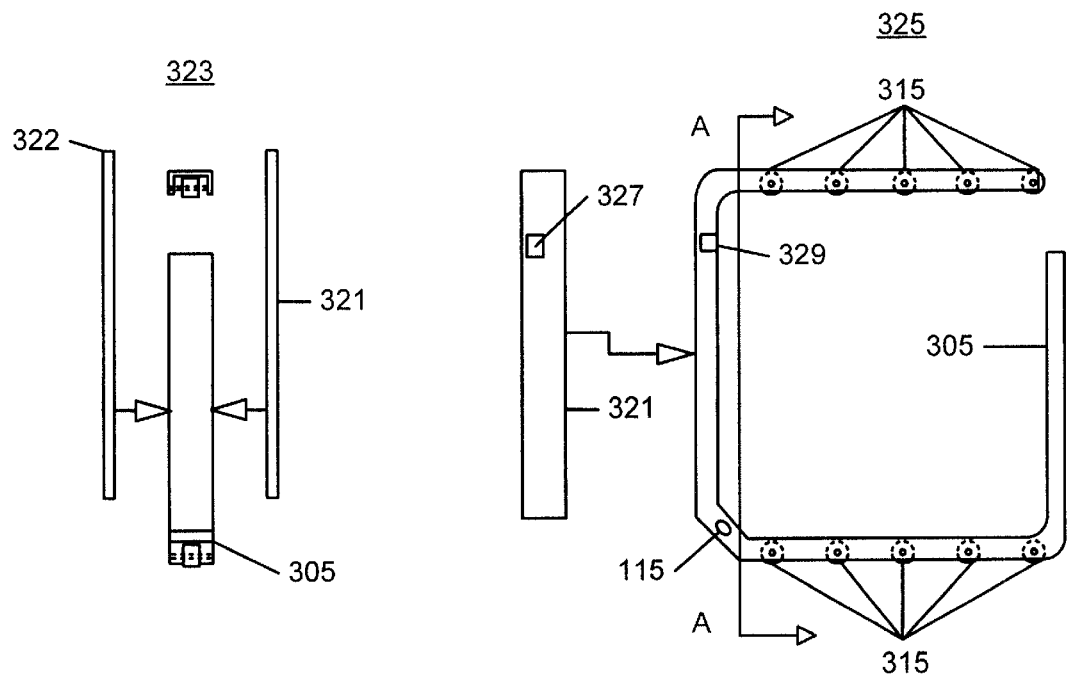
Figure 3C:
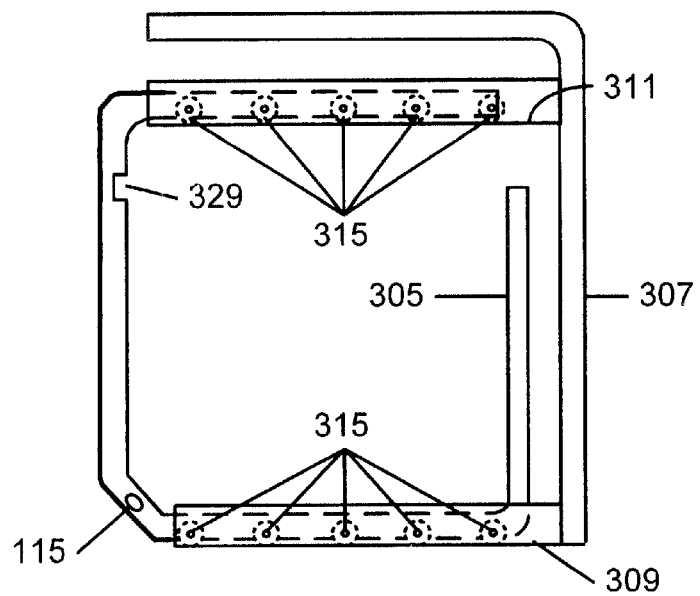

FIGS. 3A–C illustrate various views of an inner side panel frame 305 and an outer side panel frame 307, which provides support for the inner side panel frame 305. The inner side panel frame 305 is a support frame within the inner side panel 105; i.e. the inner side panel frame 305 is the inner side panel without metal (or other vehicle body panel material) skin. The outer side panel frame 307 may or may not have a skin. If the outer side panel frame does not include a skin, then the outer side panel 107 and the outer side panel frame 307 are the same. The outer side panel frame 307 may be integrated within the inner and outer walls of the pickup truck bed 109, in which case, a skin is unnecessary. The particular configuration may depend upon whether or not the cargo area extender 100 is installed as a original equipment, a factory option or an after-market item. As explained above in conjunction with FIGS. 1A–F, second inner and outer side panels, and thus second inner and outer side panel frames, are positioned on the opposite side of the pickup bed 109 from the inner and outer side panel frames 305 and 307. The second inner and outer side panel frames are mirror images of the inner and other side panel frames 305 and 307, respectively, and therefore, for the sake of simplicity, are not shown separately.

FIG. 3A illustrates a side view 303 and a front, or head-on, view 301 (from the perspective of the "A—A" line in FIG. 3A) of the outer side panel frame 307. Two channels, a lower channel 309 and an upper channel 311, are shown both head-on (view 301) and in profile (view 303). The channels 309 and 311 support the inner side panel frame 305 (see FIG. 3C). A third, inverted channel 313 at the top of the outer side panel frame 307 acts as a mounting bracket for affixing the outer side frame 307 to the pickup bed 109 and also for attaching a skin. The view 301 shows the outer side panel frame 307 positioned within the inner side wall 335 and the outer side wall 333 of the pickup bed 109.

FIG. 3B illustrates a side view 325 and a head-on view 323 (from the perspective of the "A—A" line in FIG. 3B) of the inner side panel frame 305. Views 323 and 325 illustrate a reinforcement strip 321 that fits against the inner side of the inner side panel frame 305. The reinforcement strip 321 includes a latch hole 327 that fits over a notch 329 in the inner side panel frame 305. Another reinforcement strip 322, without a latch hole, fits on the other, outer side of the inner side panel 305, directly across from the reinforcement strip 321. FIG. 3B also illustrates a connecting rod pin point 115, shown in FIGS. 1A–1F and described in more detail below in conjunction with FIG. 6B–C, and upper and lower rollers or bearings 315.

FIG. 3C is a side view of the inner side panel frame 305 and the outer side panel frame 307 mated together in a closed position, as the panels 105 and 107 appear in FIG. 1A. The outer side panel frame 307 is fixed with respect to the pickup bed 109 (FIG. 1), and the inner side panel frame 305 moves with respect to the outer side panel frame 307. The outer side panel frame 307 includes the lower channel 309, in which the inner side panel frame 305 slides. The lower rollers, or bearings, 315 in the bottom of the inner side panel frame 305 enable the inner side panel frame 305, and thus the inner side panel 105, to slide within the channel 309 with little resistance. The outer side panel frame 307 also includes the upper channel 311, which, like the lower channel 309, supports the inner side panel 105. The rollers or bearings 315 on the top of the inner side panel frame 305 fit within the upper channel 311 and also reduce the sliding resistance of the inner side panel 105. A connecting rod pin point 115 is positioned in the left lower corner of the inner side panel frame 305 (FIGS. 1A–F). The connecting rod pin point 115 provides a place for the connecting rod 113 (FIGS. 1A–F, to be connected to the inner side panel 305 (FIGS. 3B–C).

Figure 3D:
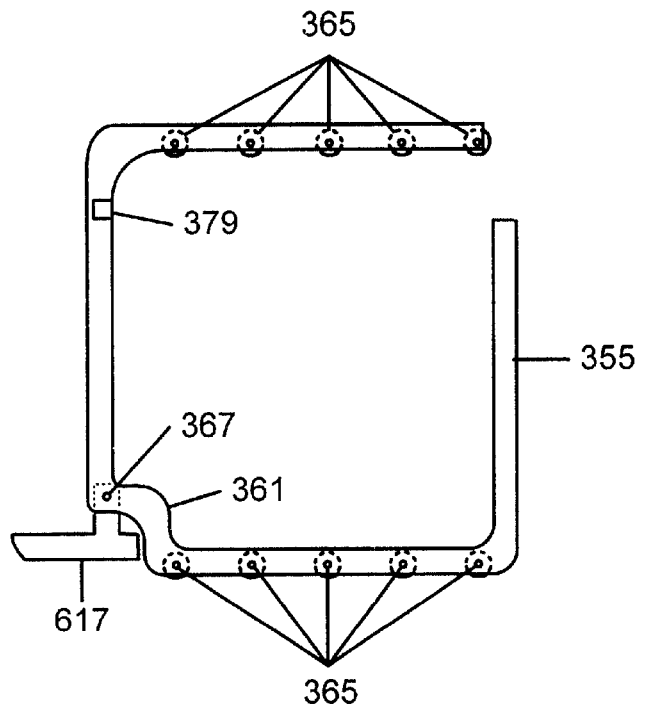
FIG. 3D is a diagram of an alternative inner side panel frame with a different connecting pin arrangement.

FIG. 3D is a diagram of an alternative inner side panel frame 355, with a different connecting rod arrangement than the inner side panel frame 305. In this example, the inner side panel frame 355 includes rollers or bearings 365, a notch 379 and a connecting rod pin point 367, all similar in function and description to the bearings 315, the notch 329 and the connecting rod pin point 317, respectively. Also illustrated is a connecting rod 617, described in more detail below in conjunction with FIG. 6. This particular configuration of inner side panel frame 355 and connecting rod pin point 367, with a bend 361 in the inner side panel frame 355, provides greater stability than the inner side panel frame 305 and connecting rod pin point 317 when the inner side panel 355 is moved either forward or backward, such as when the inner side panel 105 is moved with respect to the outer side panel 107. In addition, the configuration of FIG. 3D also increases the initial backward motion of the inner side panel 355 when the cargo area extender (FIGS. 1A–1F) is changed from the Tailgate Closed position (FIG. 1A) to the Tailgate Open position (FIG. 1C).

Figure 6A:
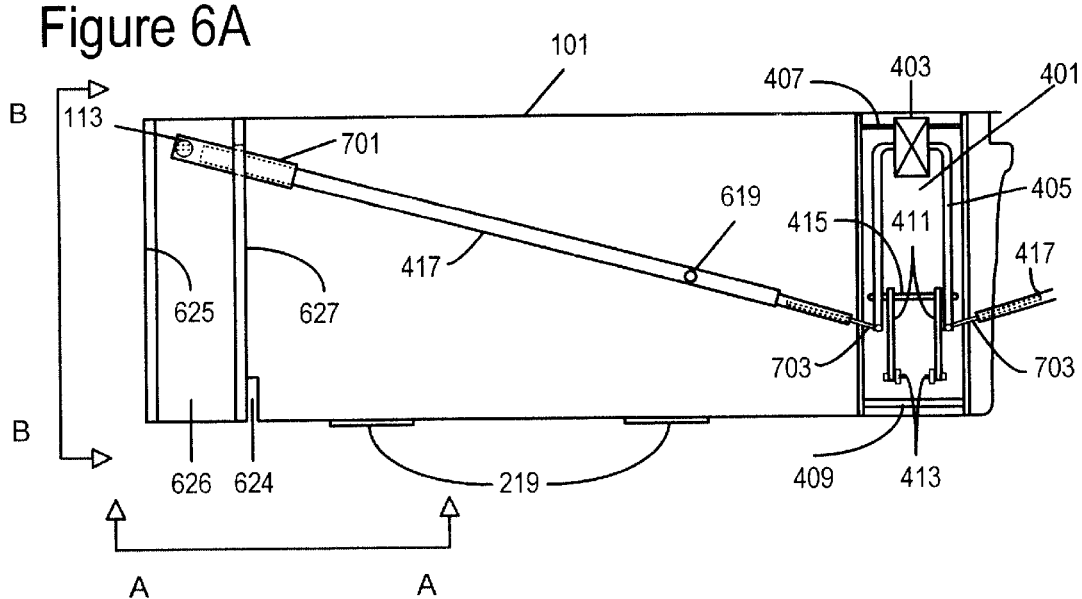
FIGS. 6A–6C are various views of the bottom panel of FIGS. 1 and 2 in more detail.

FIGS. 4A–E illustrate various positions and views of a side panel opening and latching mechanism 401. As shown in FIG. 6A, the opening and latching mechanism 401 is located in the center of the bottom panel 101. The opening and latching mechanism 401 may be either in a recess in the bottom panel 101 or attached directly to the pickup tailgate inner panel through an opening in the bottom panel 101. Two bars 411 connect to the fixture points 413 at one end and to a rod 415 at the other end. The rod 415 is fastened to a U-shaped handle 405. The distance from the attachment point of the rod 415 to the open end of the U-shaped handle 405 is approximately equal to one half (½) the length of the slot 419 (FIG. 4C), plus clearance, and approximately two thirds (⅔) of the length of the bar 411. A latch handle 403 is fastened to the closed end of the U-shaped handle 405. The latch handle 403, in a closed position (with respect to the inner side panel 105) illustrated in FIG. 4A, hooks around a locking bar 407, which keeps the latch handle 403, the U-shaped handle 405, the rod 415 and the bars 411 from moving unless a user purposely operates them. The open ends of the U-shaped handle 405 have holes through which two connecting rods 703 (see FIGS. 7A–B) are fastened. The inner side panel 105 is linked to the U-shaped handle 405 via rod 703, rod 417, sleeve 701 and connecting rod 113 or 617 through slots 419 and 629 respectively. Before the connecting rods 703 attach to the ends of the U-shaped handle 405, the rods 703 pass through the slot 419 in a rail 421 that is part of the bottom panel 101. The rail 421 may be stamped into the bottom panel 101 or may be a separate piece attached to the bottom panel 101. A second locking bar 409 is used to fasten the latch handle 403, and thus the opening and latching mechanism 401, in an open position (with respect to the inner side panel 105), in a fashion similar to the manner the locking bar 407 maintains the opening and latching mechanism 401 in the closed position.

Although, in the disclosed embodiment, the opening and latching mechanism 401 is held in the open and closed positions by hooking the latch handle 403 around the locking bars 407 and 409 respectively, it should be apparent to those with skill in the mechanical arts that there are numerous alternatives that might serve this purpose. For example, a ring and a clip or some type of latch and corresponding latch receptacle may be employed to secure the open and latching mechanism 401 into various positions.

Figure 4A:
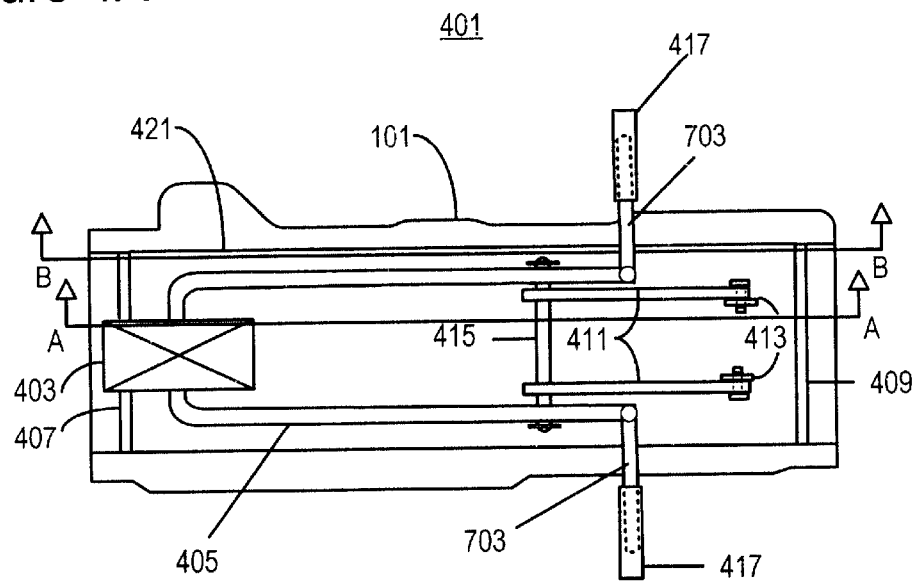
FIGS. 4A–4E are various views of an opening and latching mechanism of the inner side panel of FIGS. 1 and 3.
Figure 4B:
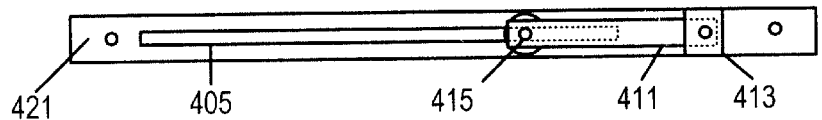

FIG. 4B illustrates a side view of the opening and latching mechanism 401 from the perspective of an "A—A" line in FIG. 4A, looking from left to right with respect to the orientation of the vehicle in which the cargo area extender 100 is installed. In FIG. 4B, the opening and latching mechanism 401 is in the closed position and the bars 411 and the U-shaped handle 405 are resting parallel to each other. The end of the rod 415, which passes through the end of the two bars 411 and the U-shaped handle, 405 is visible.

Figure 4C:
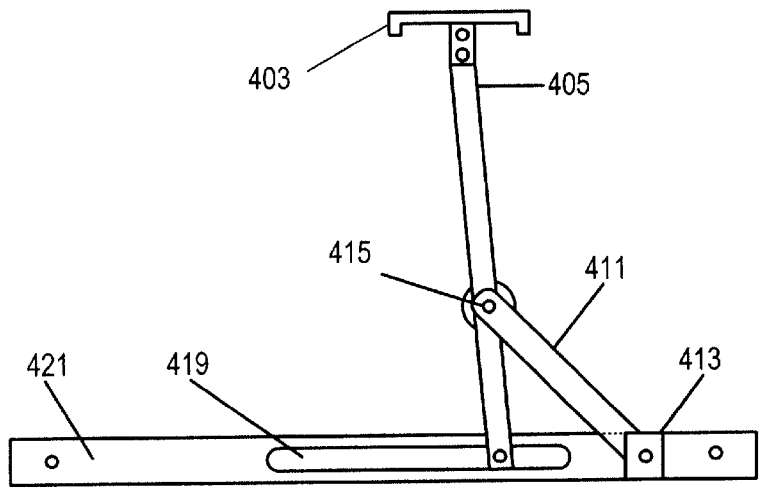

FIG. 4C illustrates a side view of the opening and latching mechanism 401 from the same perspective as FIG. 4B, but with the opening and latching mechanism 401 in an one quarter (¼) open position. In this figure, the U-shaped handle 405 is almost perpendicular to the bottom panel 101. The latch 403 affixed to the closed end of the U-shaped handle pivots around the U-shaped handle 405. As the latch 403 is pulled upward from the bottom panel 101, the open end of the U-shaped handle 405, and the attached connecting rods 703 are pushed through the slot 419 towards the front of the pickup bed 109 (FIG. 1). As the U-shaped handle 405 is pulled through an arc, initially upward and backward and then backward and downward with respect to the bottom panel 101, the movement of the connecting rods 417, each of which is linked at the outer end to the inner side panel 105, cause the inner side panel 105 to slide along the outer side panel 107 and along channel 626 (see FIG. 6A), backward with respect to the pickup bed 109.

Figure 4D:
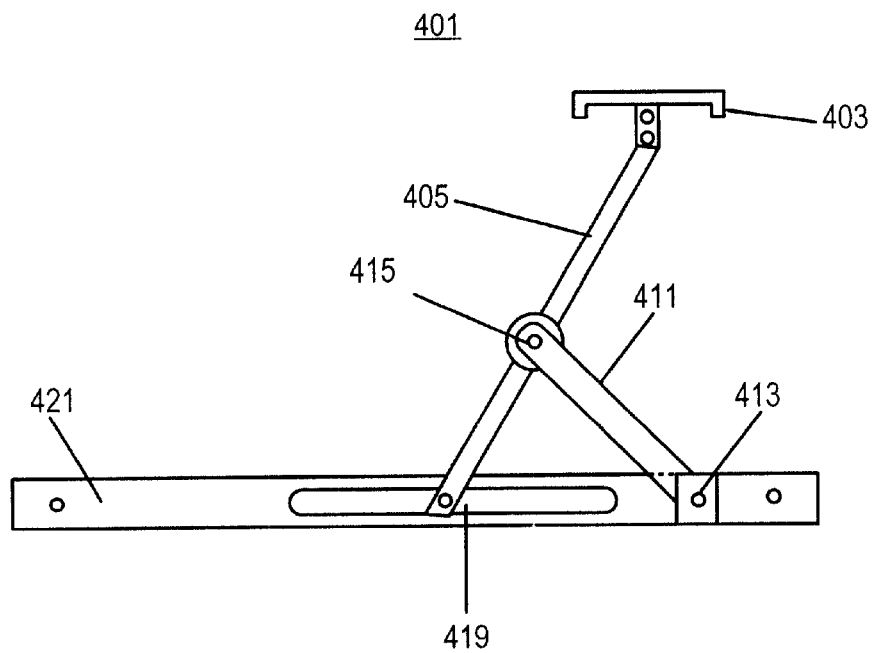

FIG. 4D illustrates the opening and latching mechanism 401 from the same perspective as the FIGS. 4B–C, but with the opening and latching mechanism 401 in a three quarter (¾) open position. In this figure, as indicated by the fact that the latch 403 remains parallel to the rail 421, it is evident that the latch 403 rotates about the U-shaped handle 405. The open end of the U-shaped handle 405, which is linked to the inner side panel 105, has slid approximately three quarters (¾) of the way to the end of the slot 419, thus pushing the inner side panel 105 farther rearward with respect to the pickup truck bed 109.

Figure 4E:
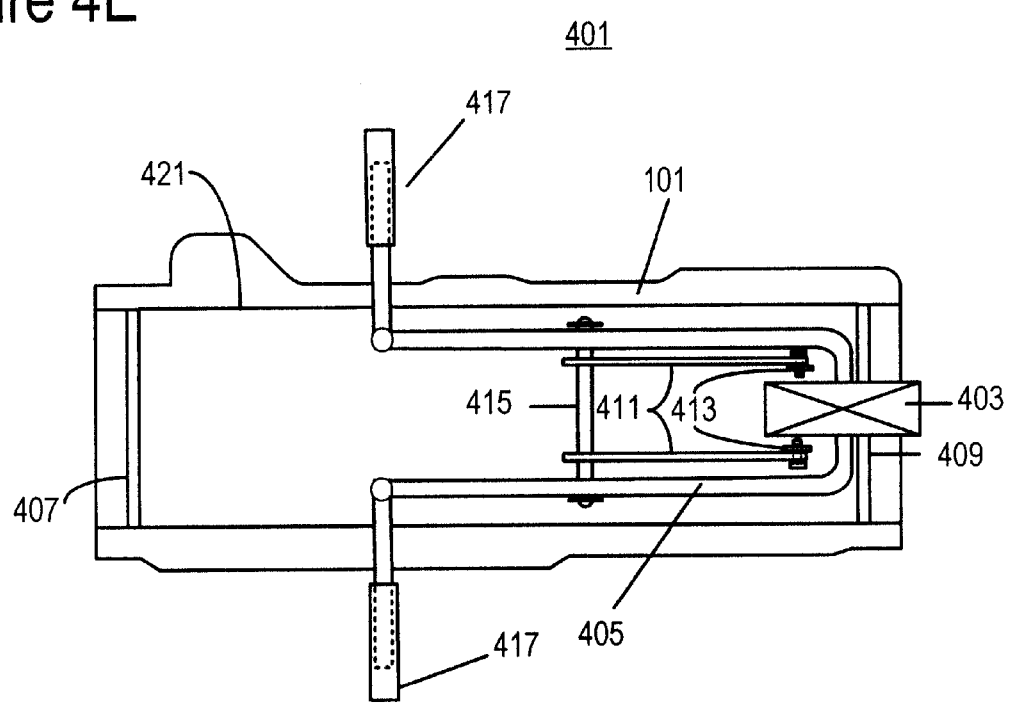

FIG. 4E illustrates the opening and latching mechanism 401 from above, the same perspective as in FIG. 4A. In this figure, the opening and latching mechanism 401 is in a fully open position with the latch 403 hooked around the bar 409 to secure the mechanism 401. Although not visible from this perspective, the open end of the U-shaped handle 405 is positioned to the far left in the slot 419 and the inner side panel 105, which is linked to the open end of the U-shaped handle 405, is fully deployed as illustrated in FIGS. 1E and 1F.

Figure 5A:
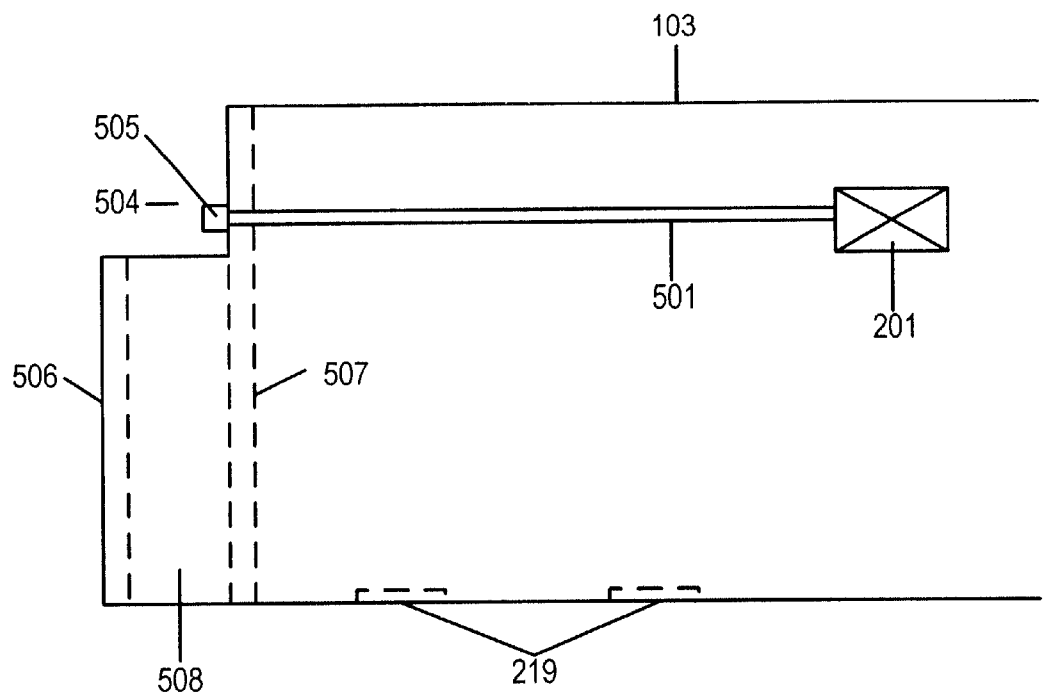
FIGS. 5A and 5B are two views of the top panel of FIGS. 1 and 2 in more detail.
Figure 5B:
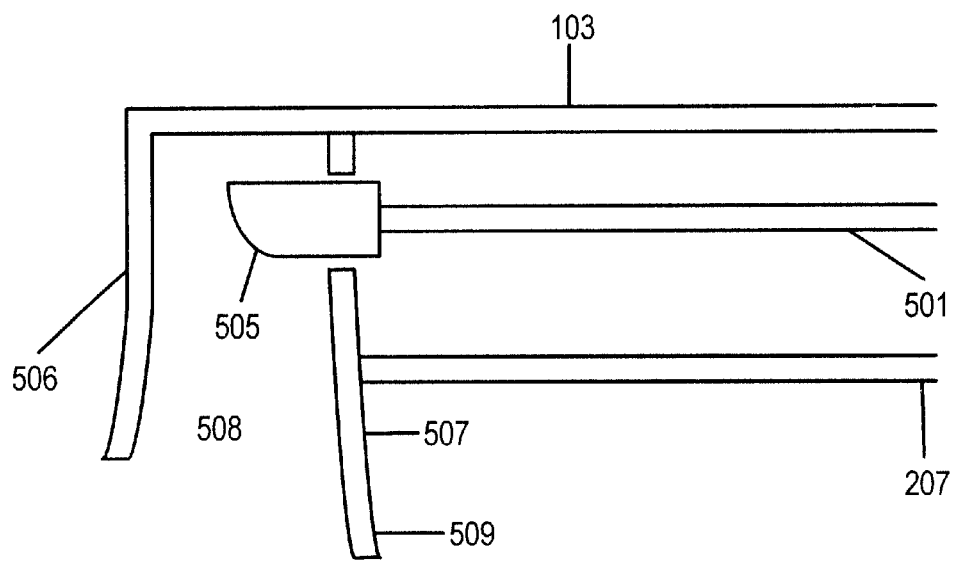

FIGS. 5A–B illustrate the top panel 103 (FIG. 1) in more detail. In FIG. 5A, the top panel includes the latch 201 (FIG. 2) and a connecting rod 501, which is enclosed within the upper and lower walls of the top panel 103. At the end of the connecting rod 501 is the latch plunger 505. The latch 201, the connecting rod 501 and the latch plunger 505 are similar to the latch, connecting rod and latch plunger mechanism found on a typical pickup truck tailgate, such as the tailgate 111 (FIG. 1). Like in a typical pickup truck tailgate, there is a second connecting rod (not shown) that extends from the latch 201 in the opposite direction of the connecting rod 501. At the bottom of the top panel 103, there are the hinges 219 (FIGS. 2A–B), which, as explained above in conjunction with FIGS. 2A and 2B, provide a means for the top panel 103 to rotate with respect to the bottom panel 101, either one hundred eighty degrees (180°) or two hundred seventy degrees (270°) depending upon where the hinges 219 are positioned.

FIG. 5B illustrates a portion of the top gate 103 at the end of the connecting rod 501. Attached to the end of the connecting rod 501 is the latch plunger 505. Of course, the second connecting rod also has a latch plunger (not shown) that performs a similar function as the latch plunger 505. When the cargo area extender 100 (FIG. 1) is in the Tailgate Closed position (FIG. 1A), the latch plunger 505 fits into the notch 213 in the tab 211 (FIG. 2) of the bottom panel 101, securing the top panel 103 and the bottom panel 101 with respect to each other. When the cargo area extender 100 is in the Top Panel Closed position (FIG. 1F), the latch plunger 505 fits through the latch hole 327 in the reinforcement strip 321 and into the notch 329 of the inner side panel frame 305 (FIG. 3). In this manner, the top panel 103 is secured to the inner side panel 105 when the cargo area extender 100 is fully deployed. An outer edge 506 and an inner flange 507 of the top panel 103 form a channel 508. When the top panel 103 is in the Top Panel Closed position (FIG. 1F), the rear edge of the side panel 105 is seated in the channel 508. The tab 509 is attached to flange 507 on the hinged side to the top panel 103. The outer edge 506 and the tab 509 are both flared near the hinged side 202 of the top panel 103 to ensure the proper alignment of channel 508 and the rear edge of the side panel 105 when the top panel 103 is rotated from the Open position (FIG. 1E) to the Closed position (FIG. 1F).

Figure 6B:
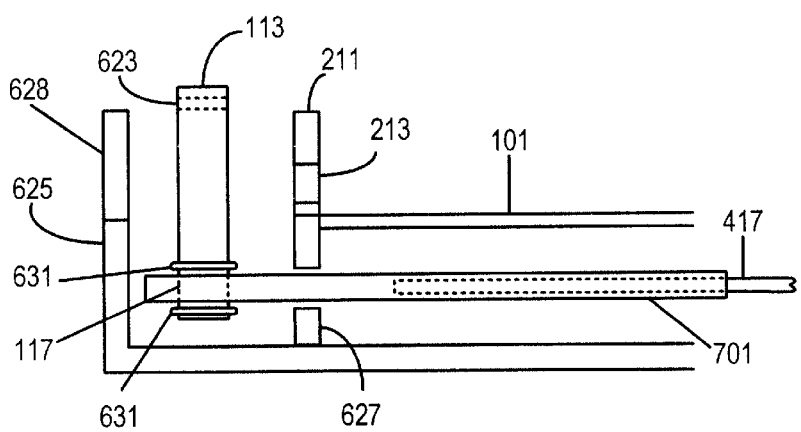
Figure 6C:
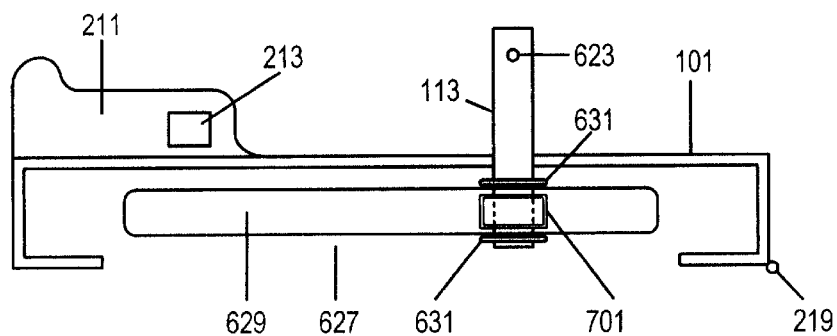

FIGS. 6A–6C illustrate the bottom panel 101 in more detail, including the opening and latching mechanism 401 (FIG. 4). The opening and latching mechanism 401 includes the latch 403, the U-shaped handle 405, the locking bar 407, the locking bar 409, the two bars 411 and the rod 415, described above in conjunction with FIG. 4A. The mechanism 401 moves the end of a connecting rod 703, causing the rod 417 to pivot around a pivot point 619. The end of the connecting rod 417 not linked to the U-shaped handle 405 via the connecting rod 703, or the "outer end," is connected to the sleeve 701 (see FIGS. 7A–B). Connecting rod 703, connecting rod 417 and sleeve 701 are internal to bottom panel 101 and are located between the outer wall of bottom panel 101 and the inner wall of tailgate 111. The sleeve 701 extends between an inner wall 627 and an outer wall 625 at the side of the bottom panel 101. The pivot point 619 is located approximately one third (⅓) of the distance from the end of the connecting rod 703 attached to the locking and latching handle 401 and the center of channel 626 formed by the inner wall 627 and the outer wall 625 when the U-shaped handle 405 is positioned ninety degrees (90°) to the bottom panel 101; i.e., when the mechanism 401 is in a one half open/one half closed position at the midpoint of its travel. The location of the pivot point 619 causes the inner side panel frame 305 to move approximately twice as far and in the opposite direction as the open ends of the U-shaped handle 405 when the opening and latching mechanism 401 is moved from a closed position to an open position. This motion causes the inner side panel frame 305 to be extended from the outer side panel frame 307. In addition, when the latch 403 is hooked around the locking bar 409, the inner side panel frame 305 (and the inner side panel 105 that it is part of) is secured in a locked and open position. The bottom panel 101 has a notch 624 to accommodate the tab 509 on the top panel 103.

FIG. 6B illustrates a side view (from the perspective of the "A—A" line in FIG. 6A) of the outer portion of the connecting rod 417 and sleeve 701, which include a connecting rod 113 (FIGS. 1A, 1B and 1E), which is located in between the inner wall 627 and the outer wall 625. The connecting rod 113 is attached to the sleeve 701 at the pivot point 117 (FIG. 1A). The connecting rod 113 attaches to the inner side panel frame 305 and is secured by means of a pin (not shown) that fits through both the connecting rod pin point 115 (FIGS. 1A–F and 3B–C) and a pin hole 623 in the connecting rod 113.

FIG. 6C illustrates another side view (from the perspective of the "B—B" line in FIG. 6A) of the bottom panel 101 from a different perspective, showing the tab 211, notch 213 (FIGS. 2A–B), hinges 219 (FIGS. 2A–B), connecting rod 113, sleeve 701 and the pin hole 623. Also illustrated is the inner wall 627, which, from this perspective, is unobscured by the outer wall 625. From this perspective, a slot 629 in the inner wall 627 is visible. The slot 629 provides room for the sleeve 701 to slide when the opening and latching mechanism 401 is moved between the closed and open positions.

Figure 7A:
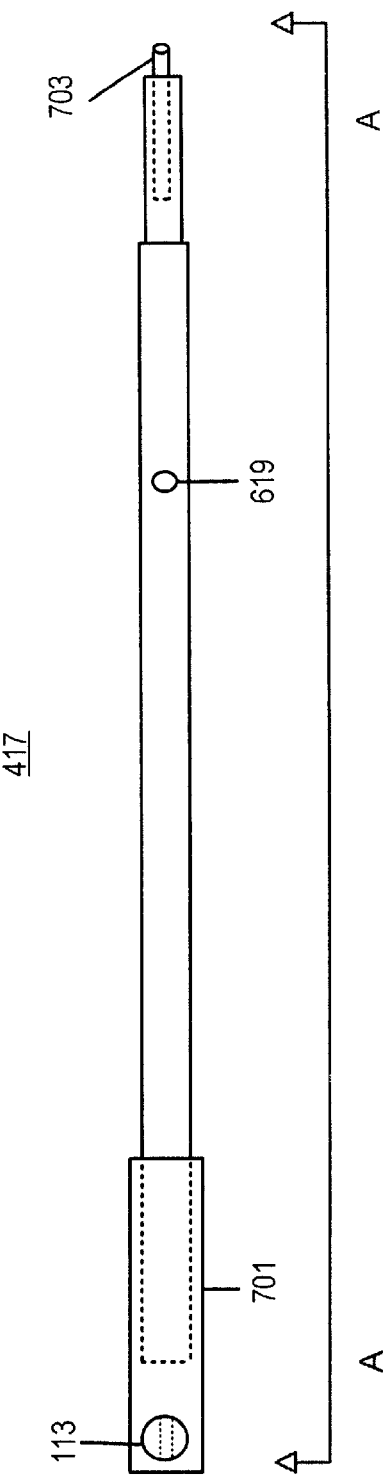
FIGS. 7A and 7B are two views of the connecting rods of FIGS. 4 and 6 in more detail.
Figure 7B:
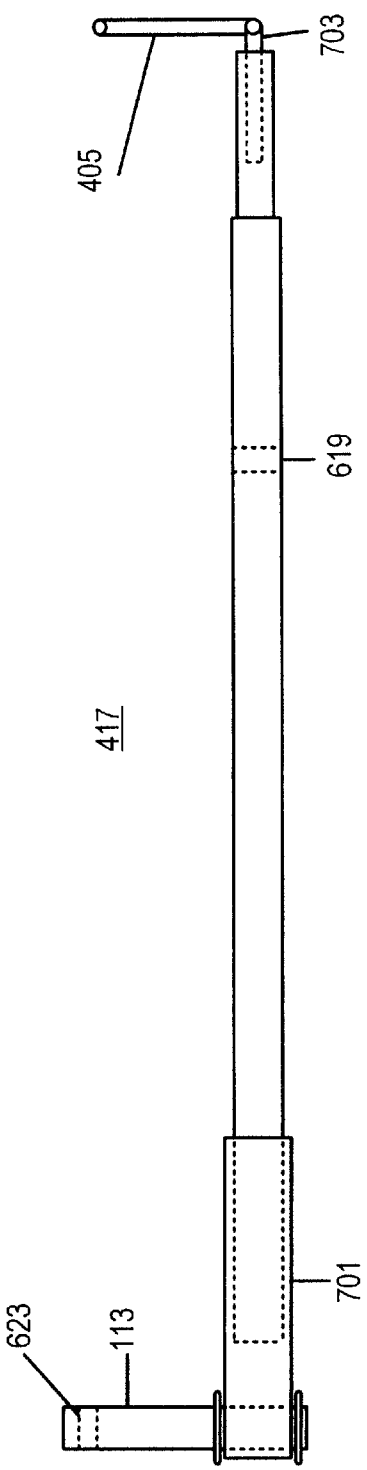

FIGS. 7A and 7B illustrate the connecting rod 417 (FIGS. 6A–C), connecting rod 703 and sleeve 701 in more detail. It should be noted that if the side panel frame 355 (FIG. 3D) is used, then the connecting rod 617 (FIG. 3D) replaces connecting rod 113 as shown in FIGS. 6B and 6C. In FIG. 7A, the pivot point 619 and the top of the connecting rod 113 are visible as well as a connecting rod 703 and an outer sleeve 701. The outer sleeve 701 is able to slide but not rotate with respect to the connecting rod 417. The connecting rod end of connecting rod 417 is tubular to allow connecting rod 703 to both slide and rotate with respect to the connecting rod 417.

FIG. 7B illustrates the connecting rod 417 from a slightly different perspective. The outer sleeve 701, the connecting rod 703, the connecting rod 113 and the pivot point 619 are all visible. In addition, the pin hole 623 in the connecting rod 113 is visible. From this perspective, one can see that the connecting rod 703 is connected to the U-shaped handle 405 (FIGS. 4A, 4E and 6A). At the end of the connecting rod 417 that is attached to the U-shaped handle 405, the connecting rod 703 slides to adjust for a change in length from the pivot point 619 and the U-shaped handle 405 as the opening and latching mechanism 401 (FIG. 6A) moves between the closed and open positions and from the open to the closed positions. The connecting rod 703 is pinned to the open end of the U-shaped handle 405 in such a manner as to rotate about the connecting rod's 703 axis and also to rotate in relation to the U-shaped handle 405 as shown in FIGS. 4A and 4E. At the end of the connecting rod 417 that is linked to the inner side panel 105, the outer sleeve 701 slides to adjust for the change in length from the pivot point 619 and the connecting rod 113, but all necessary rotation is provided by the connecting rod 113 rather than by the outer sleeve 701.

In this example, the sleeve 701 end of the connecting rod 417 is rectangular with the hollow rectangular sleeve 701 and the connecting rod 703 end of the connecting rod 417 is tubular with a round connecting rod 703. However, it should be apparent to those with skill in the mechanical arts that there might be numerous alternatives that would serve this purpose. For example, connecting rod 417 may be a hollow rectangle and the sleeve 701 could be rectangular. Similarly, connecting rod 417 may be round and the connecting rod 703 may be tubular.

Figure 8A:
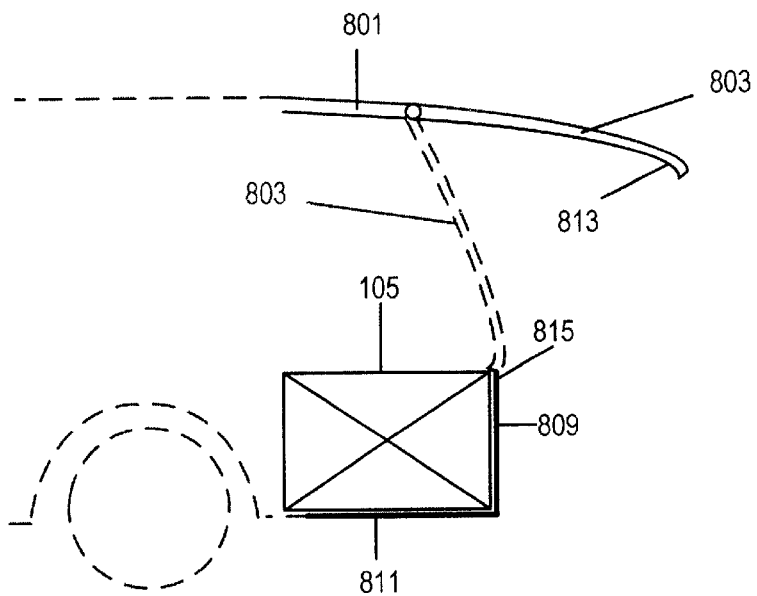
FIGS. 8A and 8B are diagrams of one embodiment of the present invention either installed or built into a sports utility vehicle (SUV).
Figure 8B:
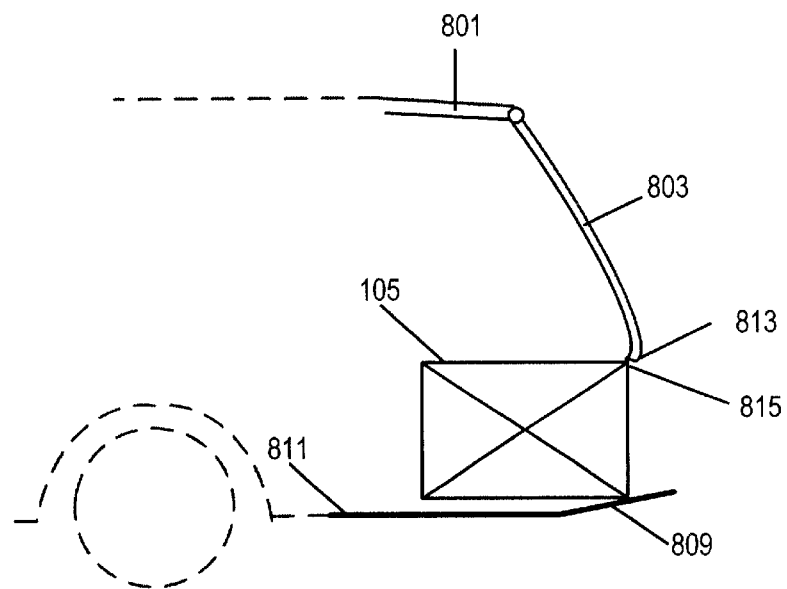

FIGS. 8A and 8B illustrate the cargo area extender 100 (FIG. 1) employed in a SUV 801, which has a bed 811, a tailgate 809 and a rear door 803, which swings up. FIG. 8A illustrates the SUV with the rear door 803 fully open, the tailgate 809 up and the cargo area extender 100 in a closed, or stored position. In FIG. 8B, the tailgate 809 is in an open position, the cargo area extender 100 is fully deployed with the inner side panel 105 extended and the rear door 803 swung down and connected to the cargo area extender 100. The rear door 803 is attached to the cargo area extender 100 using an existing door latch 813 on the rear door 803, which is attached to a corresponding latch mechanism 815 in the top panel 103 (FIGS. 1, 2 and 5) of the cargo area extender 100.

Figure 9A:
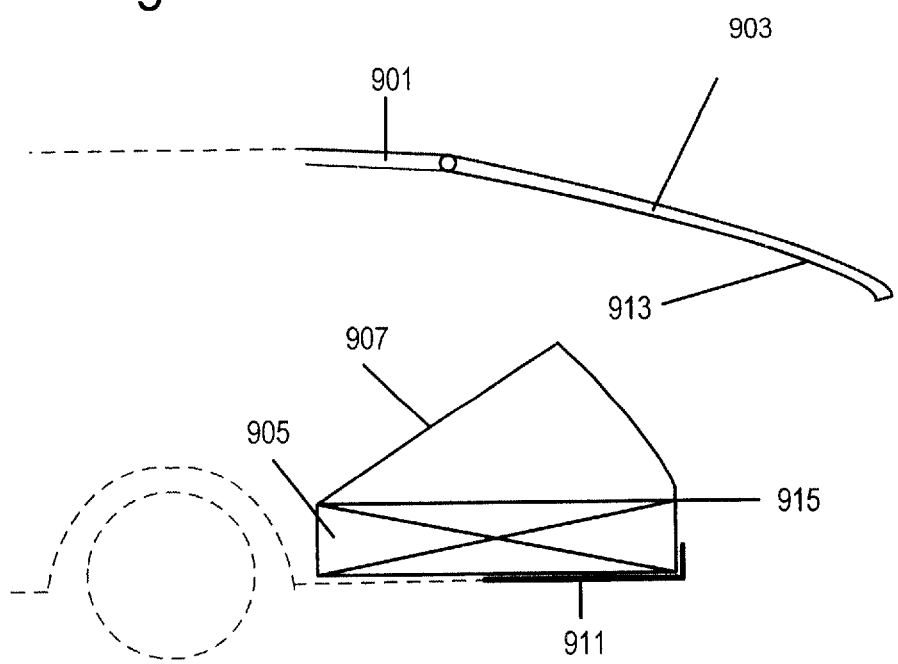
FIGS. 9A and 9B are diagrams of one embodiment of the present invention either installed or built into a minivan.
Figure 9B:
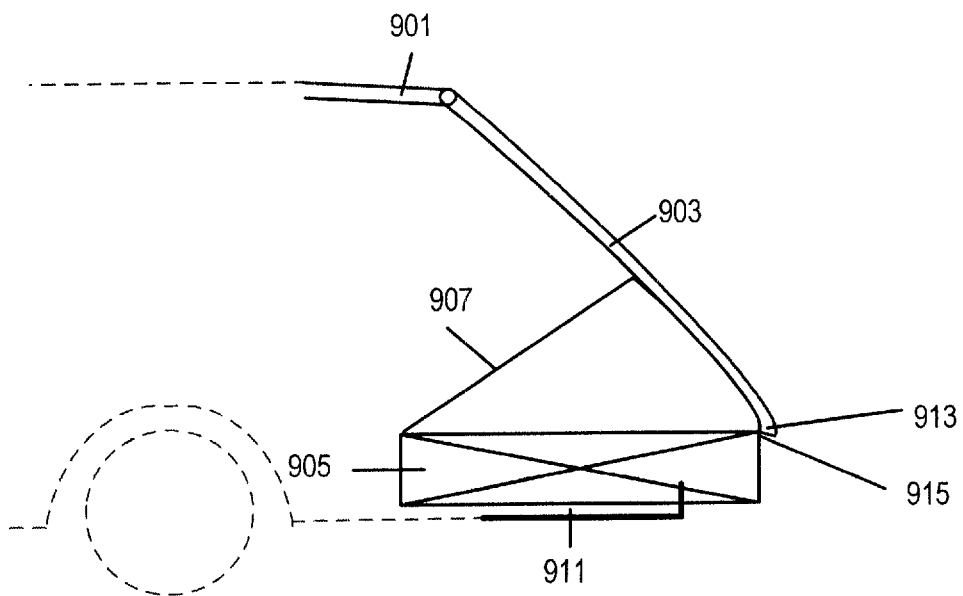

FIGS. 9A and 9B illustrate a cargo area extender employed in a minivan 901, which has a bed 911, and a rear door 903, which swings up. FIG. 9A illustrates the minivan cargo area extender in a closed position, and FIG. 9B illustrates the minivan cargo area extender in a deployed position. Like the rear door 803 (FIGS. 8A–B), which attaches to the top panel 103, the rear door 903 of the minivan latches to the top panel 103 at a latch 915 in the top panel 103 (FIGS. 1, 2 and 5) that corresponds to a standard latch 913 for the rear door 903 on the minivan 901. The side panel 905 is shown with an additional section 907 to illustrate that while the side panel frames (FIGS. 3A–D) may be contained in the "X"ed area of side panel 905, any of the side panels shown throughout FIGS. 1A–F, 3A–D, 8A–B and 9A–B may be manufactured in numerous sizes and shapes to enhance the functionality of the cargo area extender 100 by coordinating the design of the cargo area extender 100 with the design of the vehicle on which it is intended to be used.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. A cargo area extender for use in a vehicle, comprising:
   two side panels, each comprising:
      an inner side panel frame; and
      an outer side panel frame, wherein the inner side panel frame is configured to move horizontally in relation to the corresponding outer side panel frame between a stored position and an extended position;
   a bottom panel; comprising:
      a bottom panel frame;
      an opening and latching mechanism, comprising:
         a U-shaped handle, coupled to the bottom panel frame at an open end of the U-shaped handle and configured to move axially with respect to the bottom panel frame about the open end; and
         two connecting rods, each coupled to the U-shaped handle on a first end and to different inner side panel frames on a second end, configured to pivot about corresponding pivot points, located approximately one third (⅓) of the distance from the U-shaped handle and the end of each of the connecting rods, the movement causing the corresponding inner side panel frames to move between the stored position and the extended position; and
   a top panel, coupled to the bottom panel with a plurality of hinges, wherein the top panel rotates with respect to the bottom panel around the plurality of hinges, the top panel comprising:
      a latch mechanism;
      two latch connecting rods, each latch connecting rod connected to the latch handle and extending in opposite directions from the latch handle; and
      two latch plungers, each latch plunger connected to a different latch connecting rod at an end of the latch connecting rod opposite an end of the latch connecting rod that is connected to the latch handle, wherein, each latch plunger projects into a corresponding notch in the bottom panel when the cargo area extender is in a closed position, thus securing the top panel to the bottom panel, and each latch plunger projects into a corresponding notch in a different one of the inner side panel frames when the inner side panel frames are in the extended position, thus securing the top panel to the inner side panels in a cargo area extender deployed position.

2. The cargo area extender of claim 1, each connecting rod comprising:
   a main body;
   an outer sleeve coupled to the main body; and
   an inner sleeve.

3. The cargo area extender of claim 1, the U-shaped handle further comprising:
   a latch coupled to a closed end of the U-shaped handle and configured to pivot with respect to the U-shaped handle;
   a first locking structure coupled to the bottom panel frame, which when attached to the latch, secures the inner side panels in the stored position; and
   a second locking structure coupled to the bottom panel frame, which when attached to the latch, secures the inner side panels in the extended position.

4. The cargo area extender of claim 1, wherein the vehicle is a pickup truck having a cargo area in a bed of the pickup truck, the bottom panel is coupled to a tailgate and the outer side panel frames are coupled to opposing side walls of the pickup bed.

5. The cargo area extender of claim 1, wherein the vehicle is a sports utility vehicle (SUV) having a cargo area in a rear storage area of a sports utility vehicle (SUV), the bottom panel is coupled to a tailgate and the outer side panel frames are coupled to opposing side walls of the sports utility vehicle (SUV).

6. The cargo area extender of claim 5, wherein the cargo area is a storage area of the sports utility vehicle and the cargo area extender is mounted on a carriage within the sports utility vehicle.

7. The cargo area extender of claim 5, the top panel further comprising:
   a latch receptacle for securing a latch of a rear door of the sports utility vehicle (SUV) to the top panel.

8. The cargo area extender of claim 1, wherein the vehicle is a van having a cargo area in a rear storage area of the van, and the outer side panel frames are coupled to opposing side walls of the van.

9. The cargo area extender of claim 8, wherein the cargo area is a storage area of the van and the cargo area extender is mounted on a carriage within the van.

10. The cargo area extender of claim 8, the top panel further comprising: a latch receptacle for securing a latch of a rear door of the van to the top panel.

11. The cargo area extender of claim 1, wherein the vehicle is a trailer having a cargo area.

12. The cargo area extender of claim 1, wherein the vehicle is a utility vehicle having a cargo area.

13. A cargo area extender configurable for use in a vehicle having a cargo area, comprising:
   two side panels, each coupled to opposing sides of a cargo area, each side panel comprising:
      an outer side panel frame within the walls of the cargo area; and
      an inner side panel frame, wherein the inner side panel frame slides horizontally with respect to the outer side panel frame between a stored position and an extended position;
   a bottom panel; comprising:
      an opening and latching mechanism, comprising:
         a U-shaped handle, coupled to the bottom panel frame at an open end of the U-shaped handle and configured to move axially with respect to the bottom panel frame about the open end; and
         two connecting rods, each coupled to the U-shaped handle on a first end and to different inner side panel frames on a second end, configured to pivot about corresponding pivot points, located approximately one third (⅓) of the distance from the U-shaped handle and the end of each of the connecting rods, the movement causing the corresponding inner side panel frames to move between the stored position and the extended position; and
   a top panel, coupled to the bottom panel with a plurality of hinges, wherein the top panel rotates with respect to the bottom panel around the plurality of hinges, the top panel comprising:
      a latch mechanism;
      two connecting rods, each connecting rod connected to the latch handle and extending in opposite directions from the latch handle; and
      two latch plungers, each latch plunger connected to a different connecting rod at an end of the connecting rod opposite an end of the connecting rod that is connected to the latch handle, wherein, each latch plunger projects into a corresponding notch in the bottom panel when the cargo area extender is in a closed position, thus securing the top panel to the bottom panel, and each latch plunger projects into a corresponding notch in a different one of the inner side panel frames when the inner side panel frames are in the extended position, thus securing the top panel to the inner side panels in a cargo area extender deployed position.

14. The cargo area extender of claim 13, each connecting rod comprising:
   a main body;
   an outer sleeve coupled to the main body; and
   an inner sleeve.

15. The cargo area extender of claim 13, the U-shaped handle further comprising:
   a latch coupled to a closed end of the U-shaped handle and configured to pivot with respect to the U-shaped handle;
   a first locking structure coupled to the bottom panel frame, which when attached to the latch, secures the inner side panels in the stored position; and
   a second locking structure coupled to the bottom panel frame, which when attached to the latch, secures the inner side panels in the extended position.

16. The cargo area extender of claim 13, wherein the vehicle is a pickup truck having a cargo area in a bed of the pickup truck, the bottom panel is a tailgate and the outer side panels are opposing side walls of the pickup bed.

17. The cargo area extender of claim 13, wherein the vehicle is a sports utility vehicle (SUV) having a cargo area in a rear storage area of the sports utility vehicle (SUV), the bottom panel is a tailgate and the outer side panels are side walls of the sports utility vehicle (SUV).

18. The cargo area extender of claim 17, wherein the cargo area is a storage area of the sports utility vehicle and the cargo area extender is mounted on a carriage within the sports utility vehicle.

19. The cargo area extender of claim 17, the top panel further comprising: a latch receptacle for securing a latch of a rear door of the sports utility vehicle (SUV) to the top panel.

20. The cargo area extender of claim 13, wherein the vehicle is a van having a cargo area in a rear storage area of the van, and the outer side panels are opposing side walls of the van.

21. The cargo area extender of claim 20, wherein the cargo area is a storage area of the van and the cargo area extender is mounted on a carriage within the van.

22. The cargo area extender of claim 20, the top panel further comprising: a latch receptacle for securing a latch of a rear door of the van to the top panel.

23. The cargo area extender of claim 13, wherein the vehicle is a trailer having a cargo area.

24. The cargo area extender of claim 13, wherein the vehicle is a utility vehicle having a cargo area.

* * * * *